United States Patent [19]
Ohnishi et al.

[11] Patent Number: 5,229,690
[45] Date of Patent: Jul. 20, 1993

[54] APPARATUS FOR OPERATING DISCHARGE LAMPS UTILIZING A CAPACITOR AND CHARGING CIRCUIT

[75] Inventors: Masahito Ohnishi, Amagasaki; Takashi Kanda, Hirakata, both of Japan

[73] Assignee: Matsushita Electric Works, Ltd., Osaka, Japan

[21] Appl. No.: 763,265

[22] Filed: Sep. 20, 1991

[30] Foreign Application Priority Data

Sep. 25, 1990 [JP] Japan ................................ 2-255843
Feb. 15, 1991 [JP] Japan ................................ 3-021272

[51] Int. Cl.[5] ............................................ H05B 37/00
[52] U.S. Cl. ..................................... 315/226; 315/246; 315/241 R; 315/313; 315/362; 315/205; 315/207
[58] Field of Search ............... 315/160, 171, 172, 173, 315/174, 175, 200 R, 246, 283, 205, 207, 209 R, 224, 226, 241 R, 313, 362

[56] References Cited

U.S. PATENT DOCUMENTS 4,500,812  2/1985  Roche ............................ 315/241 R
4,816,721  3/1989  Ganser et al. .................. 315/241 R Primary Examiner—Robert J. Pascal
Assistant Examiner—Michael B. Shingleton

[57] ABSTRACT

An apparatus for operating discharge lamps includes first closed circuit for connecting a discharge lamp through first switching means to a pulsating power source, second closed circuit for connecting the lamp to the power source through a series circuit of second switching means which operates during OFF period of the first switching means and an energy-storing means, and an arrangement for controlling the both switching means. A pulsating source voltage is thereby applied to the discharge lamp. The apparatus is made thus capable at least of minimizing current-limiting impedance and realizing a continuously stabilized discharge of the lamp.

20 Claims, 14 Drawing Sheets

APPARATUS FOR OPERATING DISCHARGE LAMPS UTILIZING A CAPACITOR AND CHARGING CIRCUIT

BACKGROUND OF THE INVENTION

This invention relates to an apparatus for operating discharge lamps which comprises an impedance element for continuously feeding an input current to a discharge lamp and for minimizing the size of current-limiting element required.

DESCRIPTION OF RELATED ART

In a conventional apparatus for operating discharge lamps, the discharge lamp is operated by connecting a full-wave rectifier to an A.C. source for full-wave rectification, and an inverter across output ends of the full-wave rectifier with a smoothing capacitor interposed. The discharge lamp is lit and operated with the full-wave rectifier output which is converted to a high frequency after being concurrently a desirable current limitation is carried out through a choke coil connected to the inverter.

By using an inverter circuit, it is possible to minimize the size of the apparatus in a higher frequency range than in the case where the choke coil is the current limiting element. This occurs because the discharge lamp relies on the frequency of the A.C. source so long as the same level of impedance is obtained. Further, since the alternating current source is rectified and smoothed to be a direct current source, it is possible to provide a stable operating current to the discharge lamp. In this apparatus for operating discharge lamps, however, only a current of a limited phase close to the largest value of the A.C. source is contributive to the charging of the smoothing capacitor, so that an input current will have a high harmonic distortion which requires both the smoothing capacitor and the choke coil, as the current limiting element, to be of a larger value, whereby there has arisen a problem that the apparatus has been unable to be minimized in size in these respects.

In view of the above problem, there has been a suggestion in which a power source, switching element and discharge lamp are connected in series and the switching element is so set as to be of a short conduction time, to thereby omit the choke coil as the current-limiting element. In U.S. Pat. No. 3,619,716 to Joel S. Spira et al, there has been suggested an apparatus for operating discharge lamps in which ON pulse time width in the switching element is made short while the effective impedance of the discharge lamp is increased and an RC circuit connected in parallel with the discharge lamp is charged, so that charged energy can be supplied to the discharge lamp when the switching element is in OFF state. According to this arrangement, it has been possible to attain the size minimization of the apparatus in respect that series-connected large size choke coils can be omitted, but there has arisen another problem that a larger size switching element is necessitated due to the fact that all energy supply and interruption is relying on the operation of the switching element.

In another U.S. Pat. No. 3,906,302 to Dan B. Wijsboom, there has been suggested an operating arrangement in which a control mechanism is connected to a discharge lamp through a switching transistor to which an RC circuit is connected across collector and emitter of the transistor, and an inductance is connected in parallel with the discharge lamp. With this arrangement, it is made possible to apply a higher voltage to the lamp during the OFF period of the switching element, but there still has been a problem in sufficiently minimizing the size, similarly to the foregoing known art.

Further, there has been suggested in Japanese Patent Laid-Open Publication No. 50-153471 of Hiroshi Nishimura, an assignor to the same assignee as in the present case, another lamp lighting apparatus in which a switching element is connected through a control section to a source, and an RC circuit is connected in parallel with the switching element. A discharge lamp may require a relatively high starting voltage, but, after the arc is initiated, will have a considerably lower discharge-enabling voltage. With this arrangement, however, there should be a risk that the operating of the discharge lamp cannot be maintained so as to cause the lamp to flicker and finally to extinguish if the source voltage becomes lower than the discharge-enabling voltage of the discharge lamp in the event where the source voltage happens to pulsate.

It will be appreciated that, according to the conventional apparatus for operating discharge lamps, a large stress is apt to be applied to the switching element in the case when the apparatus is attempted to be miminized in size by omitting the current limiting element while maintaining desired operating function. In addition, the foregoing conventional apparatus for operating discharge lamps involves a problem in that the harmonic distortion of the current drawn from the A.C. source becomes noticeable in the case where a rectifying and smoothing circuit is connected to the A.C. source for providing a source voltage involving the pulsation, and for obtaining a relatively stable direct current voltage.

SUMMARY OF THE INVENTION

A primary object of the present invention is, therefore, to provide an apparatus for operating discharge lamps which is capable of omitting the large size current limiting element while still maintaining a stable operation of the discharge lamp even when such pulsating power source as the A.C. source is employed, reducing any stress to the switching element for restraining the flickering and eventual extinguishing while eliminating any harmonic distortion of the current drawn from the A.C. source, and, if desired, allowing the current supply to the discharge lamp to be made continuous so as to render the apparatus to be of a low noise.

The foregoing object of the invention can be attained by an apparatus for operating discharge lamps in which a first closed-circuit means is connected for connecting a discharge lamp through a first switching means to a pulsating power source for applying a pulsating power source voltage to the lamp, and the first switching means is turned ON and OFF for operating the discharge lamp, characterized in that the apparatus further comprises a second closed-circuit means for connecting the discharge lamp through a series circuit of a second switching means and an energy-storing means to the pulsating power source, the second switching means being conducting and non-conducting at least during the non-conducting period of the first switching means for applying the pulsating source voltage to the lamp, a third closed-circuit means including a third switching means for attaining and applying to the discharge lamp a superposed voltage of the pulsating power source voltage and the energy in the energy-storing means with their polarities made coincident with each other to be in the same direction in a period in which a discharge lamp current supplied to the discharge lamp is insufficient due to a voltage drop at the pulsating power source notwithstanding the conducting state of the first and second switching means, and a control means connected to at least one of the first to third switching means for controlling them their operation.

According to the apparatus for operating discharge lamps of the present invention, the power source, first switching means and discharge lamp are connected in series and the discharge lamp current is directly controlled for controlling the ionization. Thereby the effective impedance of the discharge lamp can be elevated to be high, the current limiting impedance can be made the minimum required or even omitted, and the continuous power supply to the discharge lamp can be realized by providing the impedance element for storing the energy through the discharge lamp and supplying the discharge lamp current while charging the impedance element with the second switching means conducting and the first switching means is non-conducting. Furthermore, the flickering or eventual extinguishing of the discharge lamp can be restrained even upon a low input voltage of the pulsating power source, by utilizing the energy-storing in the impedance element, and the harmonic distortion of the current drawn from the A.C. source can be more effectively improved than in the case of the conventional rectified and smoothed source power, by rendering the conducting period of the first switching means shorter when momentary input source voltage is high but longer when the momentary input source voltage is low to have the current to the discharge lamp controlled, consequent to which the effective impedance of the discharge lamp is made high when the input source voltage is high but is made low when the input source voltage is low.

Other objects and advantages of the present invention shall be made clear in the following description of the invention detailed with reference to accompanying drawings.

While the present invention shall now be described in detail with reference to the respective embodiments shown in the accompanying drawings, it should be appreciated that the intention is not to limit the present invention only to these embodiments shown but rather to include all alterations, modifications and equivalent arrangements possible within the scope of appended claims.

DETAILED DESCRIPTION OF THE PREFERRED EMBODIMENTS

Figure 1:
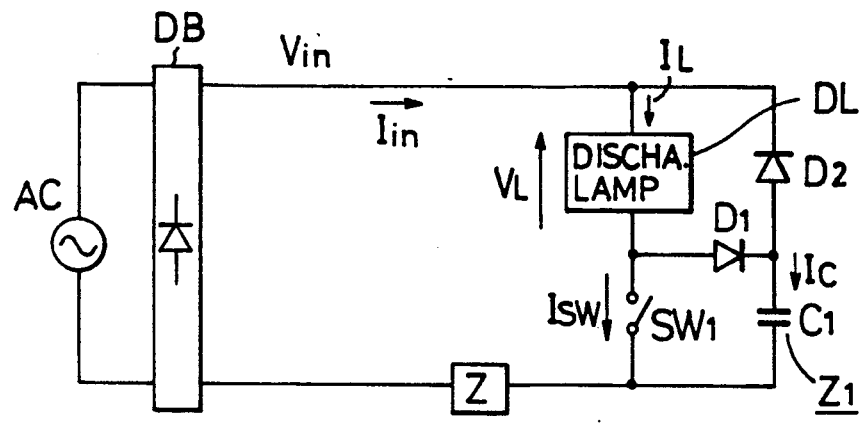
FIG. 1 is a circuitry diagram in first embodiment of apparatus for operating discharge lamps according to the present invention.

Referring to FIG. 1, there is shown a first embodiment of the apparatus for operating discharge lamps according to the present invention, in which a rectifier such as a diode bridge (DB) is connected to such pulsating power source as an alternating current source AC, a first closed-circuit means comprising a first switching means SW1 is connected to output ends of the rectifier DB and eventually to the source AC, and a discharge lamp DL is connected through the first switching means SW1 to the output ends of the rectifier DB and source AC. Furthermore, a second closed-circuit means is connected to the first closed-circuit means so that a voltage of the source AC will be received through the rectifier DB. More specifically, the second closed-circuit means comprises a series circuit of a first diode D1 acting as a second switching means conducting (ON) and non-conducting (OFF) at least during the OFF period of the first switching means SW1 and a capacitor C1 acting as an impedance and forming an energy-storing means. This series circuit of the diode D1 and capacitor C1 is connected to both ends of the first switching means SW1.

With respect to the first and second closed-circuit means, further, a third closed-circuit means comprising a second diode acting as a third switching means functioning to attain a superposed voltage of the pulsating power source and stored energy in the capacitor C1 with their polarities made coinciding with each other in the same direction and to apply the attained superposed voltage to the discharge lamp DL within a period in which lamp current supply to the discharge lamp DL becomes insufficient due to a voltage drop of the pulsating power source notwithstanding that the first and second switching means are in the ON state. Between an end of the rectifier DB and the first switching means SW1, a proper impedance Z may be inserted, if required. For the second and third switching means, any other element than the diode but achieving the same function may be employed and, further, a control means (not shown) may also be connected to the first to third switching means for controlling their ON and OFF operation.

Now, in the apparatus for operating discharge lamps of FIG. 1, as the first switching means SW1 is turned ON under condition that a rectified voltage Vin of the rectifier DB is higher than the discharge-enabling voltage of the discharge lamp DL, ions are increased, a discharge lamp current IL shows a tendency of increase, and the conductance of the discharge lamp increases. As the first switching means SW1 is turned OFF at a set current value, the discharge lamp current IL is made zero. This cause the ions to decrease with a time constant of the discharge lamp and the conductance of the discharge lamp to also decrease. The operation of the discharge lamp DL is maintained by the turning ON and OFF of the first switching means SW1. This is one of the basic arrangements of the present invention. The present embodiment is arranged so that when the first switching means SW1 is in its OFF state and the source voltage VAC is lower than the discharge-enabling voltage VL of the discharge lamp DL, the energy-storing in the capacitor C1 included in the second closed-circuit means, as the energy-storing means is utilized for maintaining the operation of the discharge lamp DL.

Figure 2:
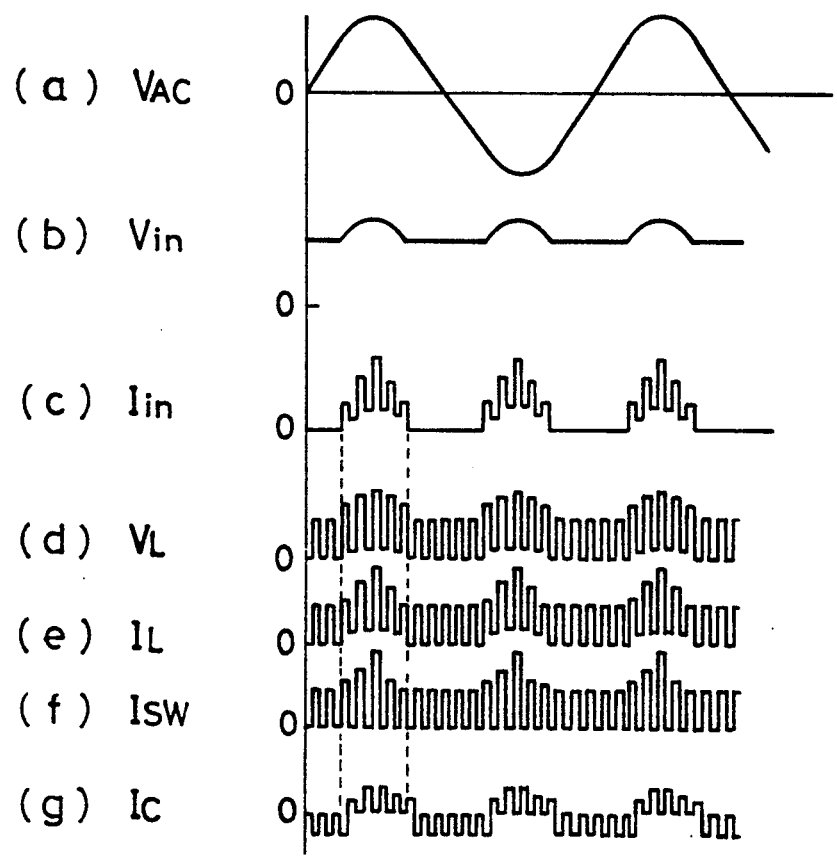
FIG. 2 shows waveforms attained at various parts in the circuit of FIG. 1.

Next, the operation of the apparatus for operating discharge lamps of FIG. 1 shall be described with reference to FIG. 2. Now, the source voltage VAC of a such waveform as shown by (a) in FIG. 2 is supplied from the alternating current source AC. The voltage VAC is rectified at the rectifier DB, and a voltage Vin of a waveform as in (b) of FIG. 2 is applied to following stage circuit element. If in this discharge-enabling voltage VL of the discharge lamp DL, a current Iin as shown in (c) of FIG. 2 is supplied from the source AC side to the discharge lamp DL. In the OFF state of the first switching means SW1, a charging current Ic as shown in (g) of FIG. 2 is caused to flow to the capacitor C1 through the first diode D1 acting as the second switching means to be conducting and non-conducting in the OFF state of the first switching means SW1, and the capacitor C1 is thereby charged. As the rectified voltage Vin starts dropping due to a drop in the source voltage VAC, the energy supply from the source AC side to the capacitor C1 stops, the current Iin is made zero, and the energy in the capacitor C1 is supplied to the discharge lamp DL through the second diode D2 acting as the third switching means upon turning ON of the first switching means SW1.

When the rectified voltage Vin is higher than the discharge voltage of the capacitor C1, such discharge lamp voltage VL as shown in (d) of FIG. 2 is applied to the discharge lamp DL upon turning ON of the first switching means SW1, and such discharge lamp current IL as in (e) of FIG. 2 is made to flow. When the first switching means SW1 is turned OFF at its predetermined current value, as will be clear from a waveform (f) of FIG. 2, the discharge lamp current IL flowing through the capacitor C1 decreases but the charge voltage to the capacitor C1 increases. On the other hand, and the discharge lamp conductance decreases gradually, upon which the capacitor C1 is so charged that the voltage at the capacitor C1 (corresponds to flat portion of the rectified voltage Vin) will be higher than the discharge-enabling voltage of the discharge lamp DL. Provided that the capacitor C1 has an impedance, it can be regarded that a charging circuit is present from the discharge lamp DL to the capacitor C1 so that the voltage of the capacitor C1 substantially can be raised up to both the voltage of the series circuit of the discharge lamp DL and the first switching means SW1.

The energy discharged from the capacitor C1 is supplied through the diode D2 as the third switching means to the discharge lamp DL, since the diode D1 as the second switching means is disposed to be reverse directional. The thus applied voltage has an envelope substantially equal to such rectified voltage Vin as shown by (b) in FIG. 2, and the discharge lamp voltage VL, discharge lamp current IL and current ISW flowing through the first switching means SW1 are shown at (d), (e) and (f) in FIG. 2, respectively. Accordingly, in the case when the source voltage is a pulsating type (i.e., alternating current), the discharged energy can be utilized for the energy supply at the time adjacent to zero-cross points, so as to be able to prevent the flickering and eventual extinguishing of the discharge lamp from occurring, while stably maintaining the operating of the discharge lamp DL without imparting any large stress to the switching means, in particular, the first switching means. Further, when the capacitor C1 is charged through the discharge lamp DL, the capacitor C1 is capable smoothing the rectified voltage Vin, prolonging the term for which the charging current to the capacitor C1 flows, and improving the harmonic distortion of the current drawn from the A.C. source.

Figure 3:
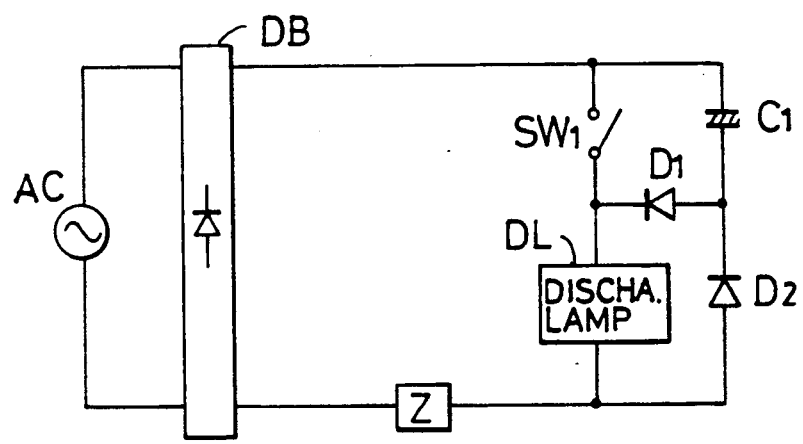
FIGS. 3 and 4 are circuitry diagrams in other working aspects of the apparatus according to the present invention than that of FIG. 1.

In another arrangement shown in FIG. 3, as will be clear when compared with the apparatus shown in FIG. 1, substantially the same arrangement is adopted, except that the first switching means SW1 is disposed on a higher potential side with respect to the discharge lamp DL and the capacitor C1 is also disposed on a higher potential side with respect to the second diode D2 as the third switching means, and the same effect of preventing the flickering and extinguishing of the discharge lamp DL, reduction of any stress imparted to the switching means, and effective improvement in respect of the harmonic distortion of the current drawn from the A.C. source can be attained.

Figure 4:
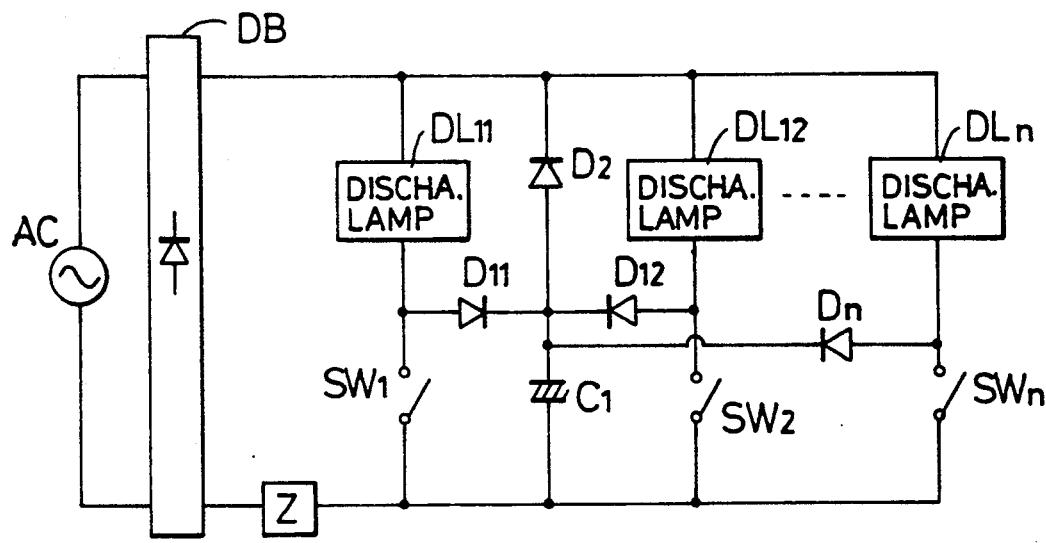

In still another arrangement shown in FIG. 4, the apparatus is adapted to the operating of a plurality of discharge lamps DL11, DL12, ... DLn, and a plurality of the first switching means SW1, SW2, ... SWn are provided respectively in correspondence to each of these discharge lamps. Furthermore, a plurality of the first diodes D11, D12, ... Dn acting as the second switching means are connected respectively in correspondence to each of the discharge lamps DL11, DL12, DLn and the first switching means SW1, SW2, ... SWn, while the capacitor C1 as the energy-storing means and the second diode D2 as the third switching means are utilized in common. Other arrangements are the same as those in the embodiment of FIG. 1, and the same operation and effect as in the case of FIG. 1 can be attained.

Figure 5:
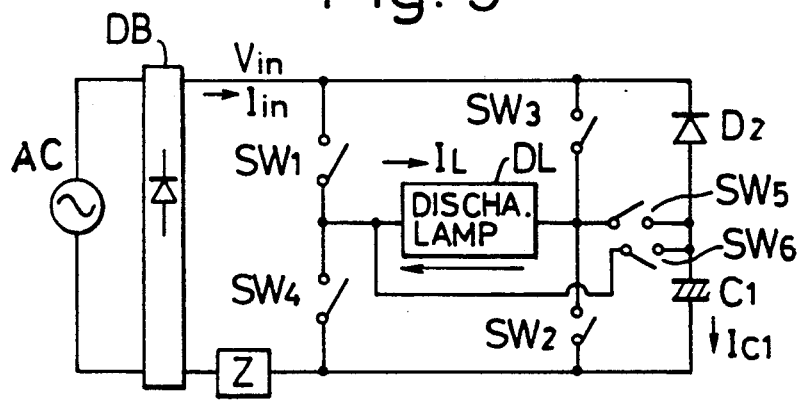
FIG. 5 shows in a circuitry diagram a second embodiment of the apparatus according to the present invention.

Referring next to FIG. 5, there is shown a second embodiment of the apparatus for operating discharge lamps according to the, present invention, in which four switching devices, SW1 to SW4, of the first switching means SW1, SW2, SW3 and SW4 are disposed in a full bridge mode, so that alternately turning ON and OFF of two pairs of these switching devices SW1, SW2 and SW3, SW4 will cause an alternating current to be supplied to the discharge lamp DL connected to the middle branch of the full bridge arrangement. Furthermore, two switching devices of the second switching means SW5 and SW6 are connected respectively between each of both ends of the discharge lamp DL and a junction point between the capacitor C1 as the energy-storing means and the diode D2 as the third switching means. Other arrangements including the first to third closed-circuit means and so on are the same as those in the embodiment of FIG. 1, and such function as the charging and discharging of the capacitor C1 and so on are also the same. In the present instance, the first closed circuit means is formed to comprise four switching devices of the first switching means SW1 to SW4, the second closed circuit means is formed with two switching devices of the second switching means SW5 and SW6 and the capacitor C1, and the third closed circuit means is formed with the diode D2 as the third switching means, as will be readily appreciated.

Figure 6:
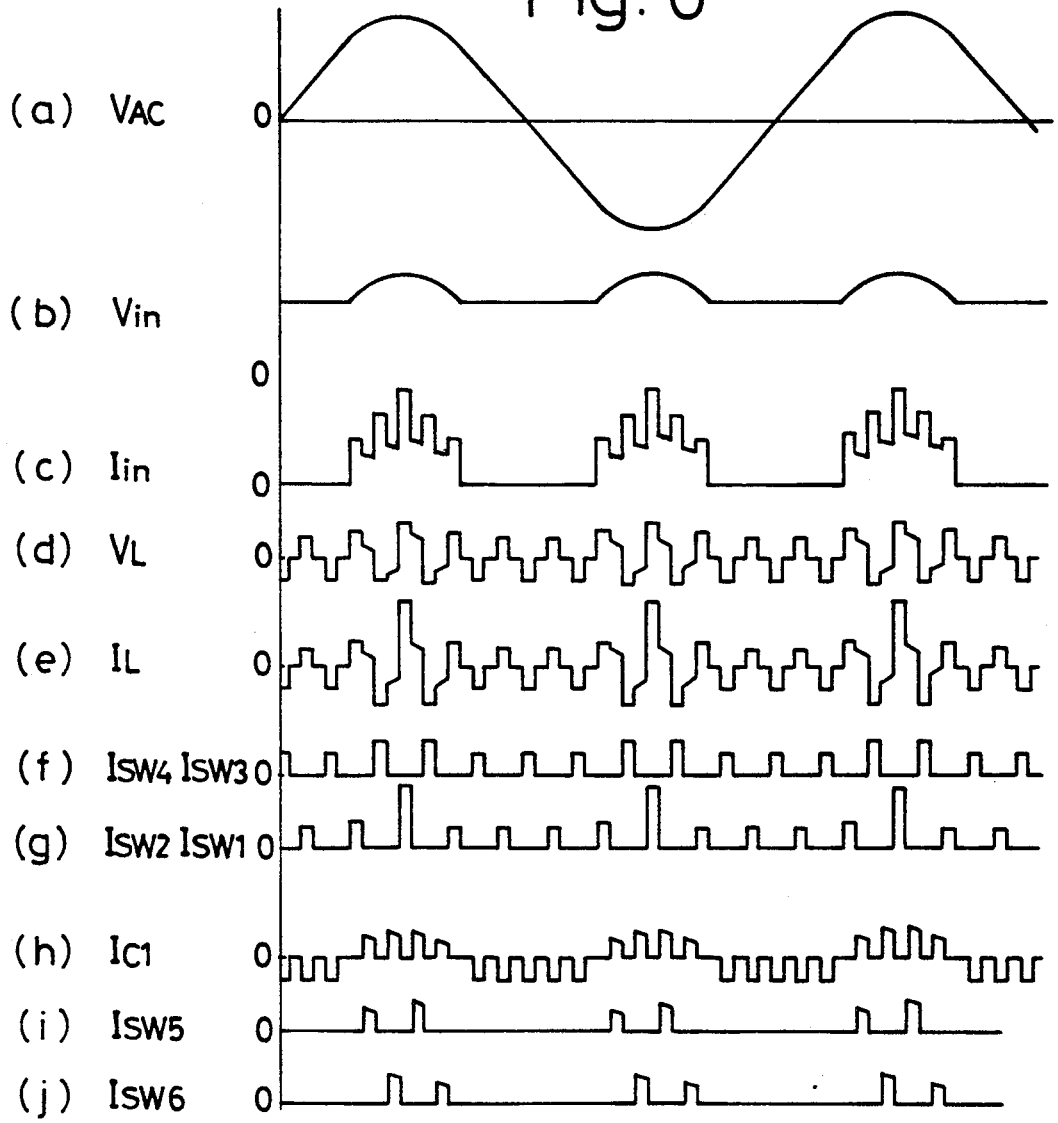
FIG. 6 shows waveforms obtained at respective parts in the circuit of FIG. 5.

In the apparatus for operating discharge lamps of FIG. 5, when one pair of the first switching means SW3 and SW4 are in the OFF state while SW1 in the other pair of the first switching means is ON and SW2 of this pair is ON or OFF. SW5 of the second switching means is OFF when SW2 is turned ON, and is ON when SW2 is turned OFF and the other SW6 of this second switching means is OFF. Furthermore, when the pair of the first switching means SW1 and SW2 are in the OFF state while SW3 in the other pair is ON and the other SW4 is ON or OFF, one SW5 of the second switching means is OFF and the other SW6 is OFF with SW4 made ON but is ON with SW4 is turned OFF. Referring more specifically in conjuction with FIG. 6, such alternating current source voltage VAC as in (a) of FIG. 6 is rectified to apply such rectified voltage as in (b) of FIG. 6 to other circuit elements at following stages, upon which the pair of the first switching means SW1 and SW2 are made ON as seen in (g) of FIG. 6 and such rectified current Iin as (c) of FIG. 6 is caused to flow but, when the rectified voltage Vin is higher than the discharge-enabling voltage of the discharge lamp DL, such discharge lamp voltage VL as in (d) of FIG. 6 is applied to the discharge lamp DL, and such discharge lamp current IL as in (e) of FIG. 6 flows through the pair of the first switching means SW1 and SW2. When one SW1 of the pair of the first switching means is turned to be in ON state whereas the other SW2 is turned OFF, then the one SW5 of the second switching means is made ON as in (i) of FIG. 6 and such charging current as in (h) of FIG. 6 is made to flow to the capacitor C1. When, on the other hand, the other pair of the first switching means SW3 and SW4 are both turned ON as in (f) of FIG. 6, the discharge lamp current IL is caused to flow through these switching means SW3 and SW4, whereby the switching means SW4 is turned OFF but the first and second switching means SW3 and SW6 are turned ON as in (f) and (j) of FIG. 6, and the capacitor C1 is charged.

Furthermore, when the rectified voltage Vin drops to be lower than the discharge-enabling voltage of the discharge lamp DL, the discharged energy from the capacitor C1 is supplied through the diode D2 as the third switching means to the respective first switching means SW1 to SW4, and eventually the alternating current is to be supplied to the discharge lamp DL.

In the embodiment of FIG. 5, other function and effect are the same as those in the embodiment of FIG. 1.

Figure 7:
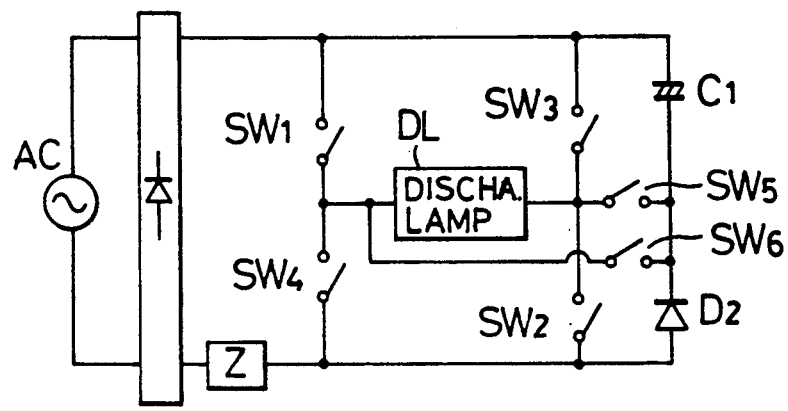
FIG. 7 shows in a circuitry diagram another working aspect of the apparatus according to the present invention than that of FIG. 5.

In a working aspect shown in FIG. 7, the energy-storing capacitor C1 is disposed on the higher potential side with respect to the diode D2 as the third switching means. When, in this aspect, the pair of the first switching means SW3 and SW4 are in OFF state while one SW2 of the other pair of the first switching means is ON and the other SW1 of this pair is ON or OFF state, one SW5 of the second switching means is OFF and the other SW6 is OFF with SW3 made ON but is ON with SW3 made OFF. Furthermore, when the pair of the first switching means SW1 and SW2 are in OFF state while one SW4 of the other pair is ON and the other SW3 of this pair is ON or OFF, one SW5 of the second switching means is OFF with SW3 made ON but is ON with SW3 made OFF, and the other SW6 is OFF. Other arrangements are the same as those in the embodiment of FIG. 1 or 5, and the same functions as in such embodiment can be obtained.

Figure 8:
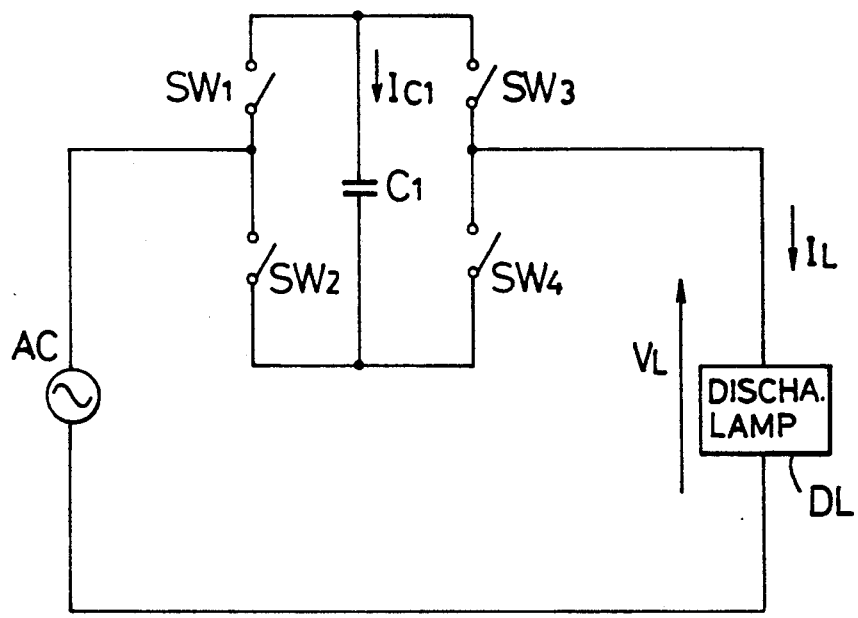
FIG. 8 is a circuitry diagram showing a third embodiment of the present invention.

Referring now to FIG. 8, there is shown a third embodiment of the apparatus for operating discharge lamps according to the present invention, in which the first switching means SW1 to SW4 are connected in a bridge circuit to the alternating current source AC, the capacitor C1 is connected in the middle branch of the bridge circuit, and the discharge lamp DL is connected to the source AC with the bridge circuit interposed. The operation of this embodiment shall be detailed with reference also to FIG. 9.

Figure 9:
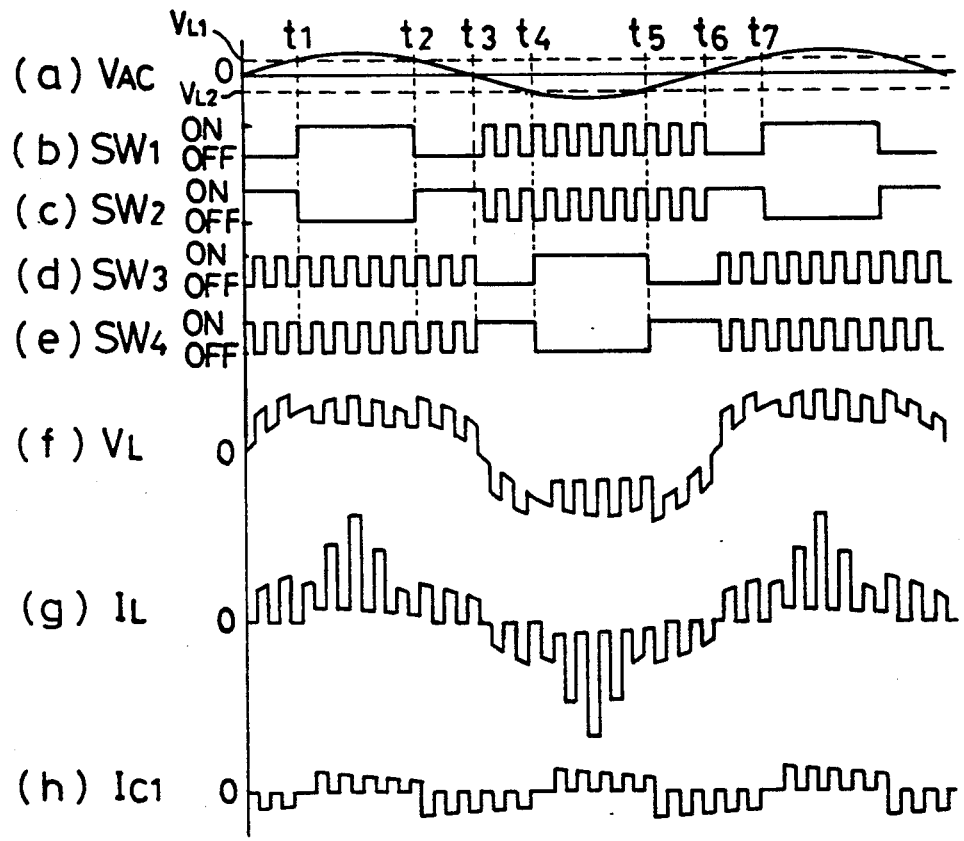
FIG. 9 shows waveforms at respective parts in the circuit of FIG. 8.

Upon application of such source voltage VAC as in (a) of FIG. 9 to the apparatus for operating discharge lamps of FIG. 8, the voltage VAC that has exceeded discharge-enabling voltages VL1 and VL2 of the discharge lamp DL causes such discharge lamp current IL as in (g) of FIG. 9 to be increased whereas, as the source voltage VAC does not reach the discharge-enabling voltage, the discharge lamp current IL decreases. Now, provided that the source voltage VAC exceeds the discharge-enabling voltage VL1 at time t1, the first switching means SW1 is turned ON while another means SW2 is made OFF while SW3 is made ON, and in the present instance the switching means SW3 and SW4 operate complimentarily (see (b) to (e) of FIG. 9). As the switching means SW3 turns ON, the source voltage VAC is applied to the discharge lamp DL, and a current flows through a path of AC→SW1→SW3→DL→AC. Here, the source voltage VAC is higher than the discharge-enabling voltage VL1 and the discharge lamp current IL elevates. And the switching element SW3 turns OFF, the current flows through a path AC→SW1→C1→SW4→DL →AC, the discharge lamp current IL decreases as shown in (g) of FIG. 9, and the capacitor C1 is caused to be charged as in (h) of FIG. 9. This capacitor C1 carries out the charging in response to the turning ON and OFF of two switching devices of the switching means SW3 and SW4 which operate complimentarily.

Furthermore, as the source voltage VAC becomes lower than the discharge-enabling voltage VL1 at time t2, the switching means SW1 turns OFF while the means SW2 turns ON, and the total voltage of the source voltage VAC and voltage of the capacitor C1 is applied to the discharge lamp DL as in (f) of FIG. 9 in response to the turning ON and OFF of the switching means SW3. As time t3 is reached, the source voltage VAC makes a zero-cross, and the polarity of the source voltage VAC is reversed after this point, upon which the switching means SW3 turns OFF while the switching means SW4 turns ON and the switching means SW1 and SW2 are complimentarily turned ON and OFF. As the switching means SW1 turns ON, a superposed voltage of the source voltage VAC and voltage of the capacitor C1 is applied to the discharge lamp DL, the discharge lamp voltage and current VL and IL are caused to rise and, as the switching means SW1 turns ON at time t4, the switching means SW3 turns ON while the other means SW4 turns OFF. Then, the source voltage VAC is applied to the discharge lamp DL, and the discharge lamp current IL is caused to increase in negative polarity of the source voltage.

At time t5, the source voltage VAC is lower than the other discharge-enabling voltage VL2, the switching means SW4 turns ON while the other means SW3 turns OFF, and the sum of the source voltage VAC and capacitor C1 voltage is applied to the discharge lamp DL in response to turning ON and OFF of the further switching means SW1 and SW2. When time t6 is reached, the source voltage VAC makes the zero-cross, the switching means SW1 turns OFF while the switching means SW2 turns ON, and the sum of the source voltage VAC and capacitor C1 voltage is applied to the discharge lamp DL in response to the turning ON and OFF of the switching means SW3 and SW4. At time t7, the same state as that at time t1 is reached, and the above operation is repeated.

It should be appreciated that the switching elements SW1 to SW4 in the foregoing embodiment may be subjected to an ON and OFF control by means of an optimum control circuit (not shown). In response to wavy variation of the pulsating source voltage, the first switching means is constituted, in certain half cycles, by the first pair SW1 and SW2 in the four bridge-connection switching means or by the second pair SW3 and SW4, the second switching means cooperating with the capacitor C1 is constituted by one SW3 of SW4 of the second pair or by one SW1 of SW2 of the first pair of the first switching means, and the third switching means is constituted by the other SW4 or SW3 of the second pair or by the other SW2 or SW1 of the first pair of the first switching means. Accordingly, it will be also appreciated that the closed-circuit means of the same action as that of the first to third closed-circuit means in the foregoing embodiment can be formed with these switching means. In the present embodiment, other arrangements have the same function and effect are the same as those in the embodiment of FIG. 1.

Figure 10:
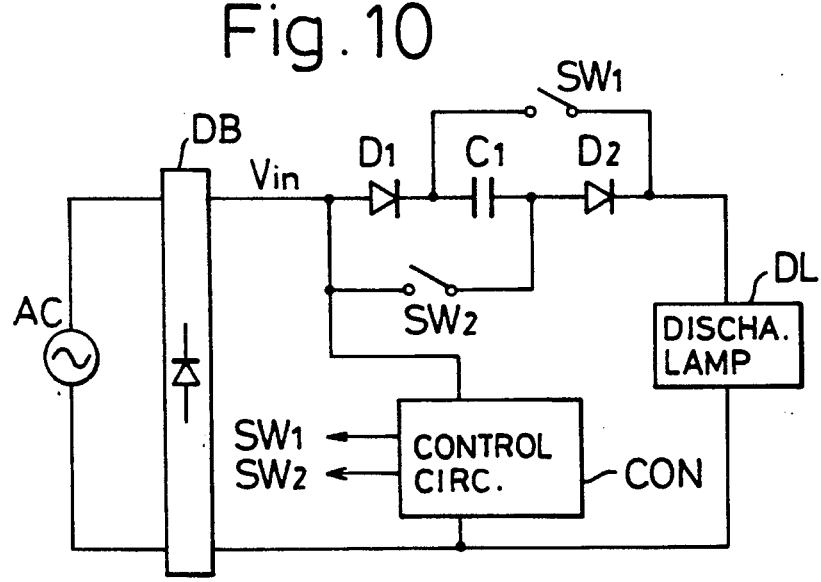
FIG. 10 is a circuitry diagram showing a fourth embodiment of the present invention.

Referring to FIG. 10, there is shown a fourth embodiment of the apparatus for operating discharge lamps according to the present invention, in which a control circuit CON is connected across the both output terminals of the rectifier DB which is connected on the other hand to the alternating current source AC, and the discharge lamp DL is further connected across the terminals of the rectifier DB through a series circuit of the diode D1 as the second switching means, capacitor C1 as the energy storage means and diode D2 as the third switching means. Furthermore, each of a pair of the switching means SW1 and SW2 is connected between a junction point of the diode D1 and capacitor C1 and a junction point of the diode D2 and discharge lamp DL and between junction point of a higher potential side terminal of the rectifier DB and diode D1 and a junction point of the capacitor C1 and diode D2. With respect to these switching means SW1 and SW2, the control circuit CON is providing ON and OFF control signals.

In the present embodiment, the switching means SW1 is driven with a constant pulse, and the switching means SW2 achieves the ON and OFF operation at the discharge-enabling voltage VL1. Furthermore, it is made possible to stabilize the discharge lamp current by rendering it to be sinusoidal with the peak values of input current restrained when input voltage is high, in such manner that ON period of the switching means SW1 in the first switching means is controlled in accordance with momentary voltage value of the voltage Vin rectified by the rectifier DB so that, when Vin is high, the ON period is shortened but, when Vin is low, the ON period is prolonged.

According to the present embodiment, the arrangement of the switching means can be made simpler than in the case of, in particular, the embodiment of FIG. 8. The function and effect of the embodiment of FIG. 8 are the same as those in the embodiment of FIG. 1, and it will be readily appreciated that the first to third closed circuit means respectively comprising the first to third switching means may be formed for achieving the same function as in the foregoing embodiments.

Figure 11:
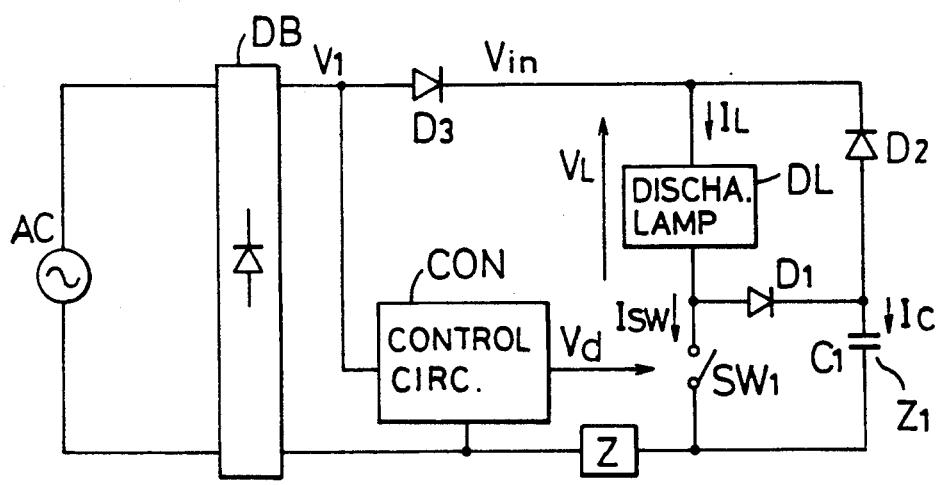
FIG. 11 is a circuitry diagram showing a fifth embodiment of the present invention.

Referring to FIG. 11, there is shown a fifth embodiment of the apparatus for operating discharge lamps according to the present invention, in which, in particular, an example of the control circuit CON not shown in FIG. 1 but connected across the output terminals of the rectifier DB is shown, and a further diode D3 is inserted between the higher potential side terminal of the rectifier DB and the discharge lamp DL. At this diode D3, the rectified voltage is divided into V1 and Vin, high or low level of the source voltage is detected by means of the value of the voltage V1, such detection is provided to the control circuit CON, and a signal is provided from the control circuit CON to the switching means SW1 for controlling the same.

Figure 12:
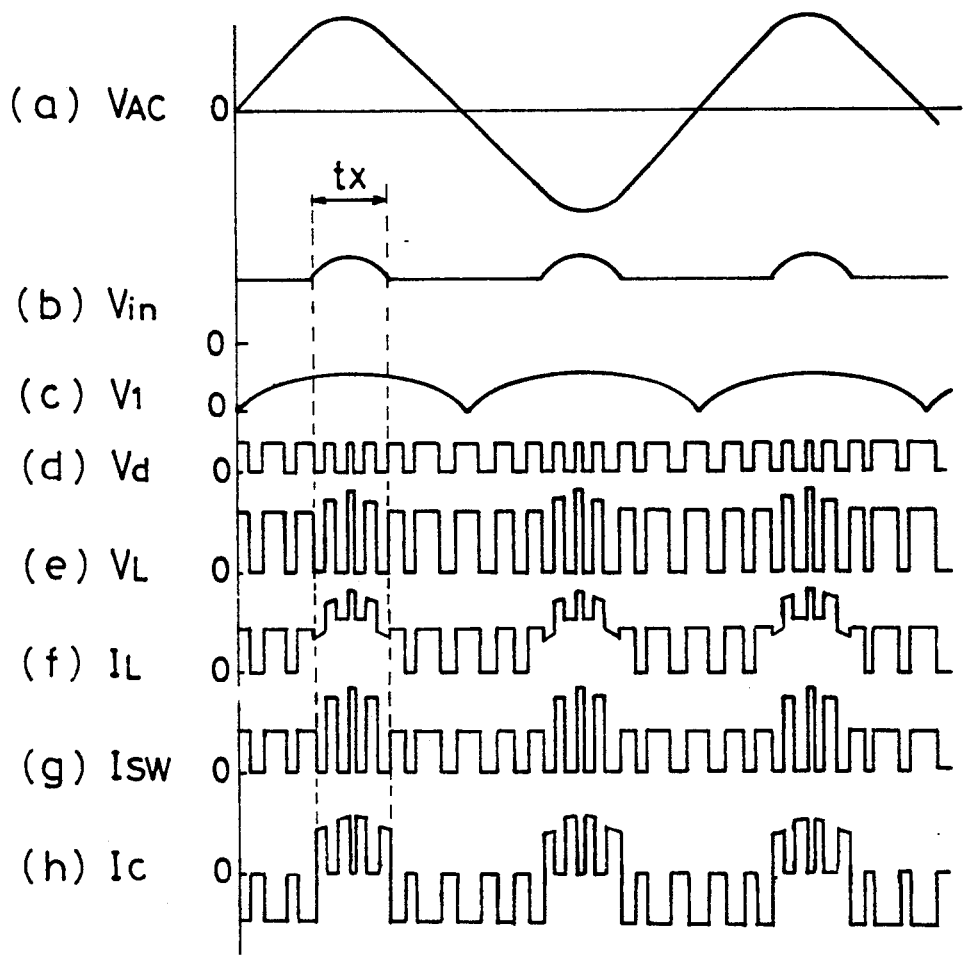
FIG. 12 shows waveforms at various parts in the circuit of FIG. 11.

Referring to the operation of this embodiment of FIG. 11 in conjunction with FIG. 12, the source voltage VAC such as (a) in FIG. 12 is applied to the apparatus, and, through the rectifier DB, such voltage V1 as (c) in FIG. 12 is applied from cathode side of the diode D3 to the control circuit CON. When this voltage V1 is discriminated at a discriminating circuit in the control circuit CON to be high, an output pulse Vd of the control circuit CON is made narrower, while this pulse width is made wider when the voltage V1 is discriminated to be low, as seen in (d) of FIG. 12. Thus, the output Vd of the control circuit CON is provided to the switching means SW1, and the voltage applied to the discharge lamp DL is made somewhat wavy as in (e) of FIG. 12 in accordance with the operation of the switching means SW1 in response to this output Vd. At this time, the current IL made to flow through the discharge lamp DL including a charge current made to flow to the capacitor C1 through the diode D1 when the switching means SW1 is in OFF state will be as in (f) of FIG. 12. Here, such stable current as in (g) of FIG. 12 is made to flow to the switching means SW1, and such charge and discharge current Ic as in (h) of FIG. 12 is caused to flow to the capacitor C1.

In the present embodiment, therefore, the controlling signal is varied in the pulse width in accordance with the level of the input voltage. That is, the signal pulse width is made narrower to restrict the discharge lamp current value when the source voltage VAC is high but is made wider to enlarge the current value, whereby the discharge lamp current IL can be made to be of the sinusoidal mode and the discharge lamp operation can be stabilized. In the present embodiment, other arrangement, function and effect are the same as those in the embodiment of FIG. 1, and the first through third closed circuit means respectively including the first to third switching means can be provided for attaining the same function as in the foregoing embodiments, as will be readily appreciated. Furthermore, the control circuit CON shown in the present embodiment may be also employed in the embodiment of FIG. 1 and in the foregoing embodiments in the identical arrangement or with the arrangement properly modified.

Figure 13:
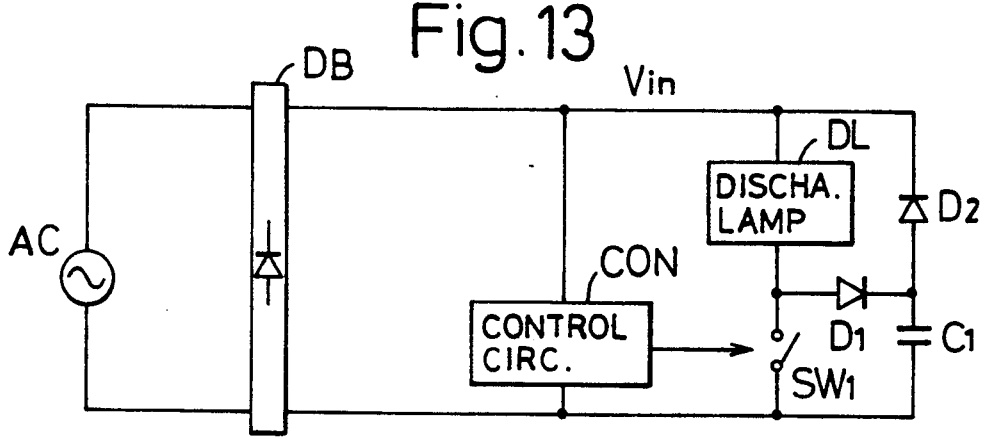
FIGS. 13 to 18 are circuitry diagrams showing respectively other working aspects of the apparatus of FIG. 11.

In a working aspect shown in FIG. 13, in contrast to the embodiment of FIG. 11, the arrangement is so made that the input to the control circuit CON is obtained from the rectified voltage Vin without use of the diode D3, and is so controlled that, when the rectified voltage Vin is high in such period tx as shown in FIG. 12, in particular, the signal pulse width is made narrower but is made wider when the voltage is low, whereby the control can be carried out with the pulse width preliminarily set in accordance with the value of the rectified voltage Vin, and the discharge lamp operation can be stabilized with the discharge lamp current made to be of the sinusoidal mode. Other arrangements, function and effect of the present aspect are the same as those in the embodiment of FIG. 11.

Figure 14:
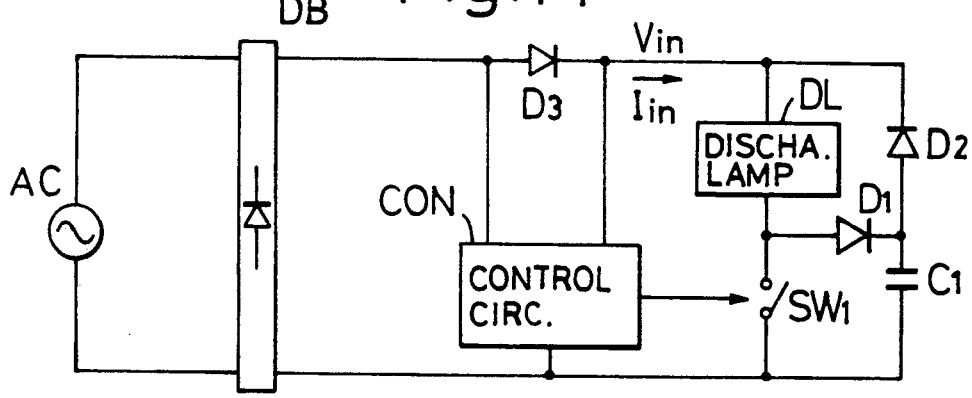

In another working aspect of FIG. 14, the arrangement is so made that the diode D3 is employed similarly to the embodiment of FIG. 11 but is connected at both ends to the control circuit CON, the current flowing to the discharge lamp DL and switching means SW1 is detected at the control circuit CON, and the control signal is provided from the control circuit CON to the switching means SW1 in accordance with the detected current value, whereby the same operation as that in FIG. 11 and FIG. 13 as well can be attained and the discharge lamp operation can be stabilized. In this arrangement, it is possible to employ, in place of the diode D3, such element as a detecting resistor or the like which does not constitute any current limiting element. In the present aspect, other arrangement, function and effect are the same as those in the embodiment of FIG. 11.

Figure 15:
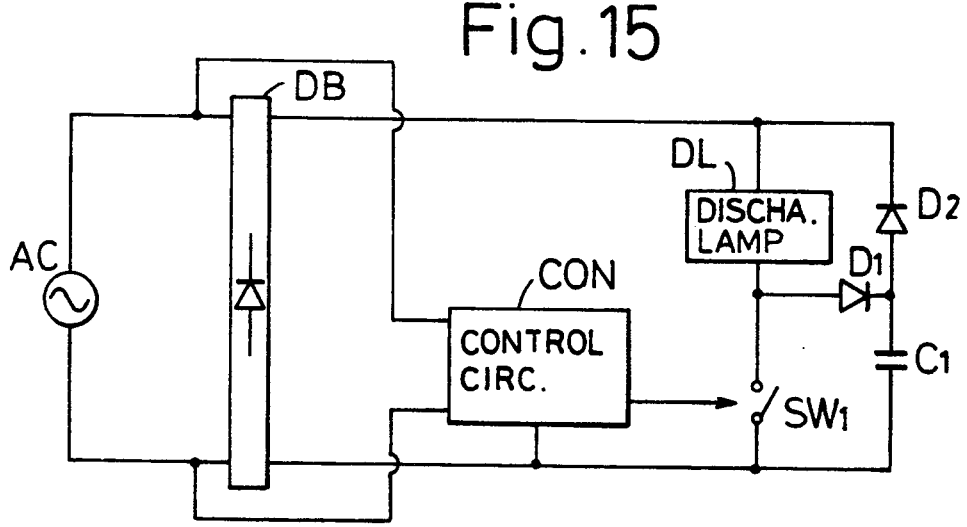

In another working aspect of FIG. 15, the arrangement is so made that the source voltage VAC is detected at the input terminal of the rectifier DB, the detected voltage value is provided as an input to the control circuit CON, and the control signal is provided from the control circuit CON to the switching means SW1, whereby the same operation as in the case of FIG. 11, 13 or 14 is carried out and the discharge lamp operation can be stabilized. The function and effect of this aspect are the same as those in the embodiment of FIG. 11.

Figure 16:
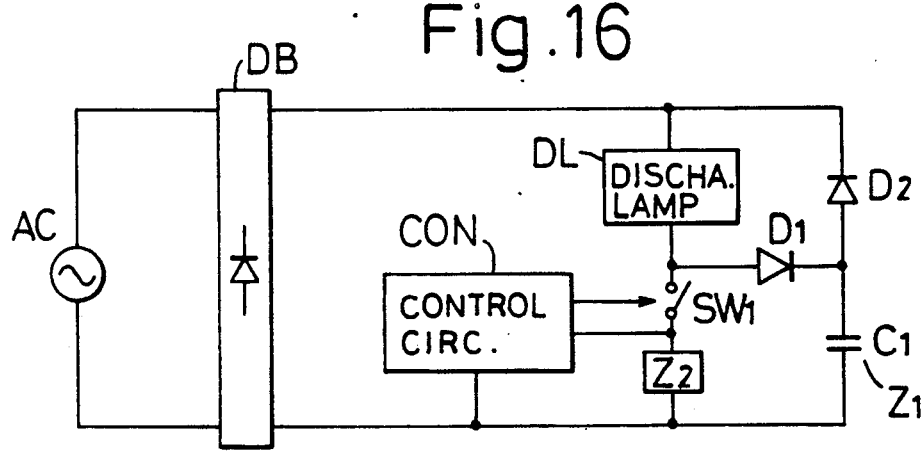

In a further working aspect shown in FIG. 16, the arrangement is so made that an impedance Z2 which does not constitute any current limiting element is inserted in series with the switching means SW1, the impedance Z2 is connected at both ends to the control circuit CON, the current flowing to the discharge lamp DL and switching means SW1 is provided to the control circuit CON, and thereby the control signal is caused to be provided from the control circuit CON to the switching means SW1, whereby the discharge lamp operation can be stabilized in the similar manner to that in the case of FIG. 11 or any of FIGS. 13 to 15. Other arrangements, function and effect of the present aspect are the same as those in the embodiment of FIG. 11.

Figure 17:
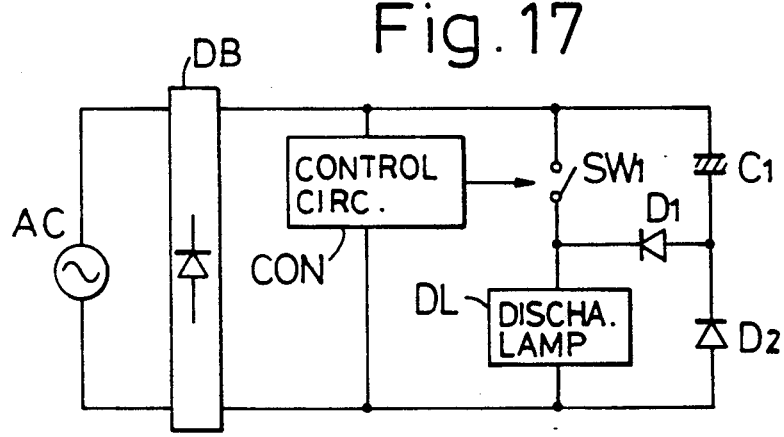

In a further working aspect of FIG. 17, the arrangement is so made that the switching means SW1 is connected on higher potential side of the discharge lamp DL in contrast to the aspect of FIG. 13, whereby the discharge lamp operation can be stabilized in the similar manner as in the case of FIG. 11 or any of FIGS. 13 to 16. Other arrangements, function and effect of the present aspect are the same as those in the embodiment of FIG. 11.

Figure 18:
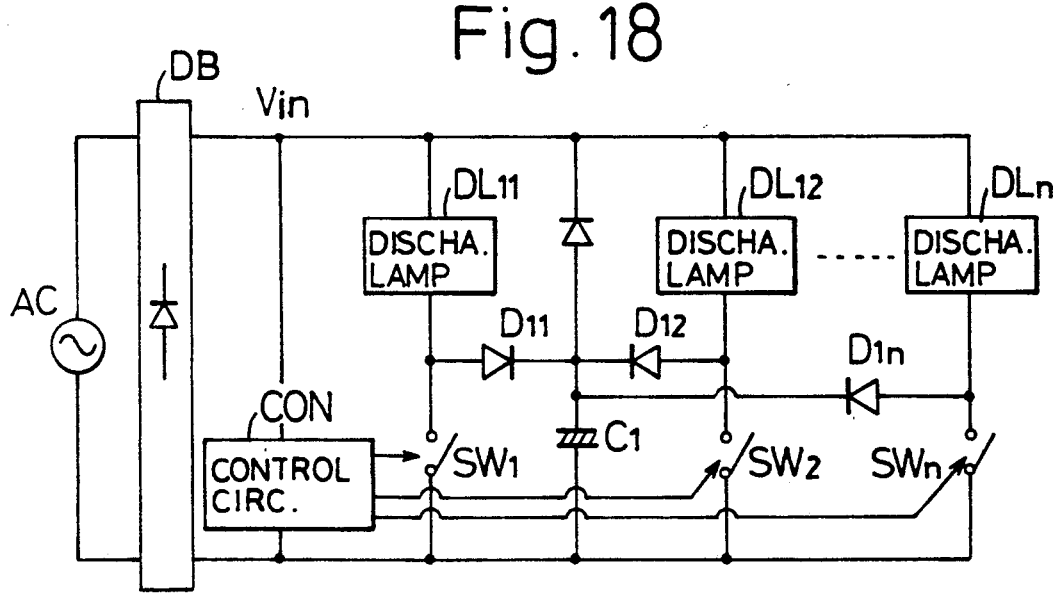

In a still further working aspect shown in FIG. 18, the arrangement is so made that, in the apparatus for the plurality of discharge lamps DL11, DL12, ... DLn as in the foregoing aspect of FIG. 4, the input to the control circuit CON is obtained from the rectified voltage Vin in the similar manner to the aspect of FIG. 13, and the control signal is provided from the control circuit CON to the respective switching means SW1, SW2, ... SWn, so that the discharge lamp operation can be stabilized in a similar manner to that in the foregoing case of FIG. 11 or any of FIGS. 13 to 17 and to that in the aspect of FIG. 4. Other arrangements, function and effect of the present aspect are the same as these in the embodiment of FIG. 11.

In providing the input to the control circuit with the detection of the level of the source voltage VAC, it will be possible, in contrast to the foregoing arrangement of FIG. 11 or any of FIGS. 13 to 18, to detect the voltage across the diode D1 or D2 or the voltage or current of the capacitor C1, so as to realize the control of the first switching means in the similar manner to that in the foregoing aspects.

Figure 19:
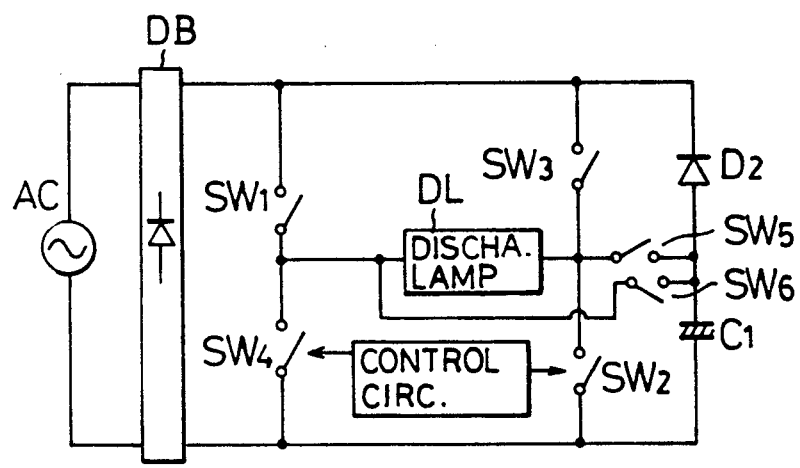
FIG. 19 is a circuitry diagram showing a sixth embodiment of the present invention.

Referring now to FIG. 19, there is shown a sixth embodiment of the apparatus for operating discharge lamps according to the present invention, in which the switching means SW1 to SW4 are connected in the full bridge mode as has been described with reference to FIG. 5, and the control signal is provided from the control circuit CON to each one SW2 or SW4 of each pair of the switching means SW1 and SW2 or SW3 and SW4. When, in this case, the switching means SW3 and SW4 are in OFF state while the switching means SW1 is in ON state and the switching means SW2 is in ON or OFF state, the second switching means SW5 turns OFF with SW2 made ON and turns ON with SW2 made OFF to cause the other second switching means SW6 to be turned OFF. When, on the other hand, the switching means SW1 and SW2 are OFF while the switching means SW3 is ON and the switching means SW4 is ON or OFF, the second switching means SW5 turns OFF and the other second switching means SW6 turns OFF when SW4 is made ON and turns ON when SW4 is made OFF. With this arrangement, too, the same stabilization of the discharge lamp operation as in the embodiment of FIG. 11 can be attained while supplying an alternating current voltage to the discharge lamp DL through the capacitor C1 and diode D2. In the present embodiment, other arrangements, function and effect are the same as those in the embodiment of FIG. 1 or 5.

Figure 20:
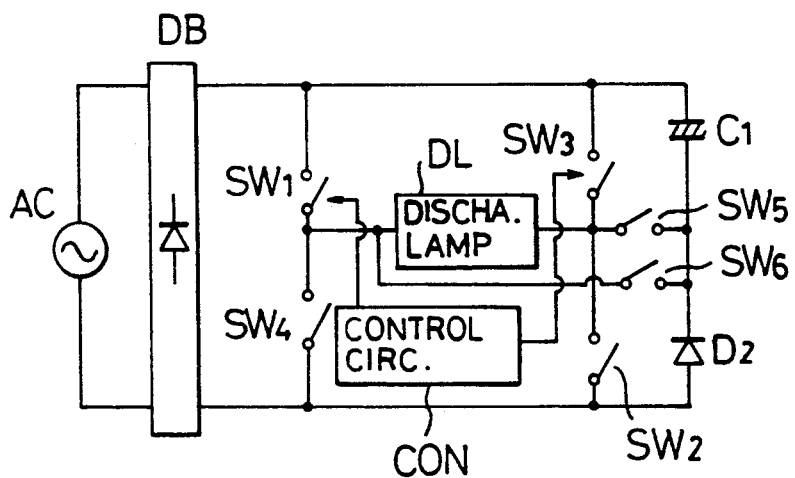
FIG. 20 shows in a circuitry diagram another working aspect of the apparatus shown in FIG. 19.

In a working aspect of FIG. 20, the arrangement is so made that the capacitor C1 is disposed on the higher potential side with respect to the diode D2, in contrast to the embodiment of FIG. 19 but similarly to the foregoing aspect of FIG. 7, and the control signal is provided from the control circuit CON to each one SW1 or SW3 of each pair of the switching means SW1 and SW2 or SW3 and SW4. When, in this case, the switching means SW3 and SW4 are in an OFF state while the switching means SW2 is ON and the switching means SW1 is ON or OFF, the second switching means SW5 is turned OFF and the other second switching means SW6 is turned OFF with SW1 made ON but is turned ON with SW1 is made OFF. When, on the other hand, the switching means SW1 and SW2 are OFF while the switching means SW4 is ON and the switching means SW3 is ON or OFF, the switching means SW5 is turned OFF with SW3 made ON but is turned ON with SW3 made OFF and the switching means SW6 is turned OFF. With this arrangement, too, the stabilization of the discharge lamp operation can be attained in the similar manner to that in the embodiment of FIG. 11 or 19, while supplying the alternating current voltage to the discharge lamp DL. In the present aspect, other arrangement, function and effect are the same as those in the case of FIG. 1 or 7.

Figure 21:
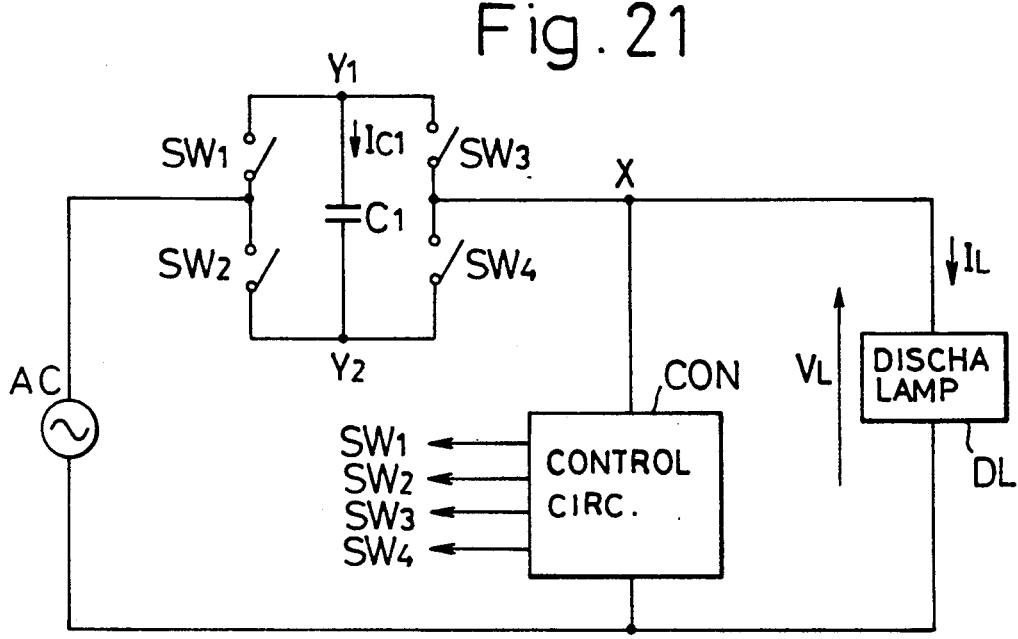
FIG. 21 is a circuitry diagram showing a seventh embodiment of the present invention.

Referring next to FIG. 21, there is shown a seventh embodiment of the apparatus for operating discharge lamps according to the present invention, in which the control circuit CON, to which the discharge lamp voltage VL is provided as a detection input, is inserted in a circuit in which the switching means SW1 to SW4 are connected in the bridge mode to the alternating current source AC and the. The capacitor C1 is connected to the middle branch of the bridge as has been described with reference to FIG. 8. The control signal is provided from the control circuit CON to the respective switching means SW1 through SW4.

Referring to the operation of this embodiment of FIG. 21 in conjunction with FIG. 22, the application of the source voltage VAC to the switching means SW1 to SW4 causes them to operate as has been described with reference to FIGS. 8 and 9. As shown in (a) to (e) of FIG. 22, the signal pulse width is made narrower when the discharge lamp voltage VL (as shown in (f) of FIG. 22) is high but is made wider when the voltage VL is low so that, as in (g) of FIG. 22, the envelope of the discharge lamp current IL will be made closer to the sinusoidal wave upon turning ON of the switching means SW1, and the harmonic distortion of the current drawn from the A.C. source can be effectively improved. At this time, the current IC1 of the capacitor C1 will be as (h) in FIG. 22. It will be appreciated that, in the present embodiment, too, the discharge lamp current IL can be stabilized by varying the signal pulse width in accordance with the level of the discharge lamp voltage VL.

Figure 23:
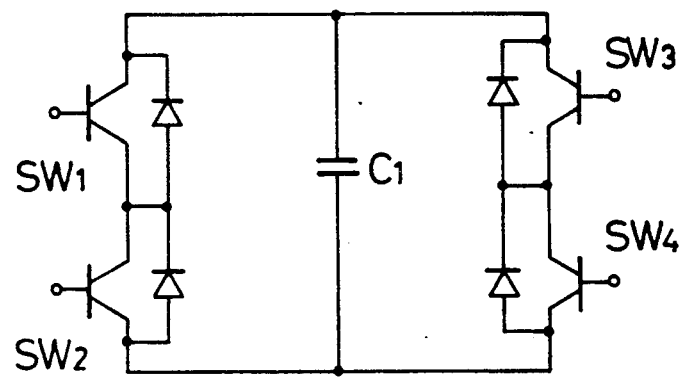
FIG. 23 is a circuitry diagram showing another working aspect of the apparatus of FIG. 21.

While in the embodiment of FIG. 21 the detection of the discharge lamp voltage VL is carried out at a point x as shown in the drawing, it will be possible to arrange the device for carrying out the detection at one of the connecting points Y1 and Y2 of the capacitor C1, so that the discharge lamp voltage VL can be detected for optimum setting of the pulse width. Prior to that, the switching means, which actuates at a relatively slow cycle, is actuated to have the capacitor C1 voltage added to the source voltage VAC and the switching means which actuates at a relatively quick cycle is actuated. Furthermore, in the foregoing embodiment of FIG. 21, as well as in the embodiment of FIG. 8, it will be possible to employ as the switching means SW1 to SW4 such reverse parallel circuits of transistors and diodes as shown in FIG. 23 or such element as a power MOSFET and the like.

Figure 24:
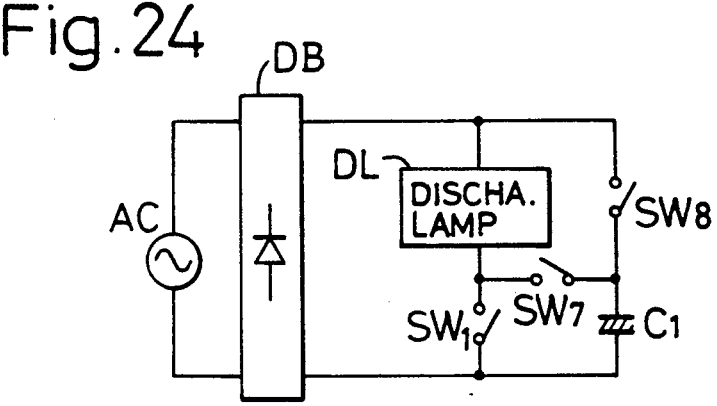
FIG. 24 shows in a circuit diagram an eighth embodiment of the present invention.

Referring to FIG. 24, there is shown an eighth embodiment of the apparatus for operating discharge lamps according to the present invention, in which the arrangement is so made that such diodes D1 and D2 as those used in the embodiment of FIG. 1 are replaced by any other switching means, optimumly, switching means SW7 and SW8 which are equal or approximate to the first switching means SW1. According to this arrangement, the charging of the capacitor C1 can be carried out independent of the ON and OFF operation of the switching means SW1, and the capacitor C1 voltage can be applied to a series circuit of the switching means SW1 and discharge lamp DL for a desired period by means of the ON and OFF operation of the switching means SW8. According to the present embodiment, therefore, the discharge lamp current IL is made more precisely controllable than in the case of the embodiment of FIG. 1. Other arrangement, function and effect of the present invention are the same as those in the embodiment of FIG. 1.

Figure 22:
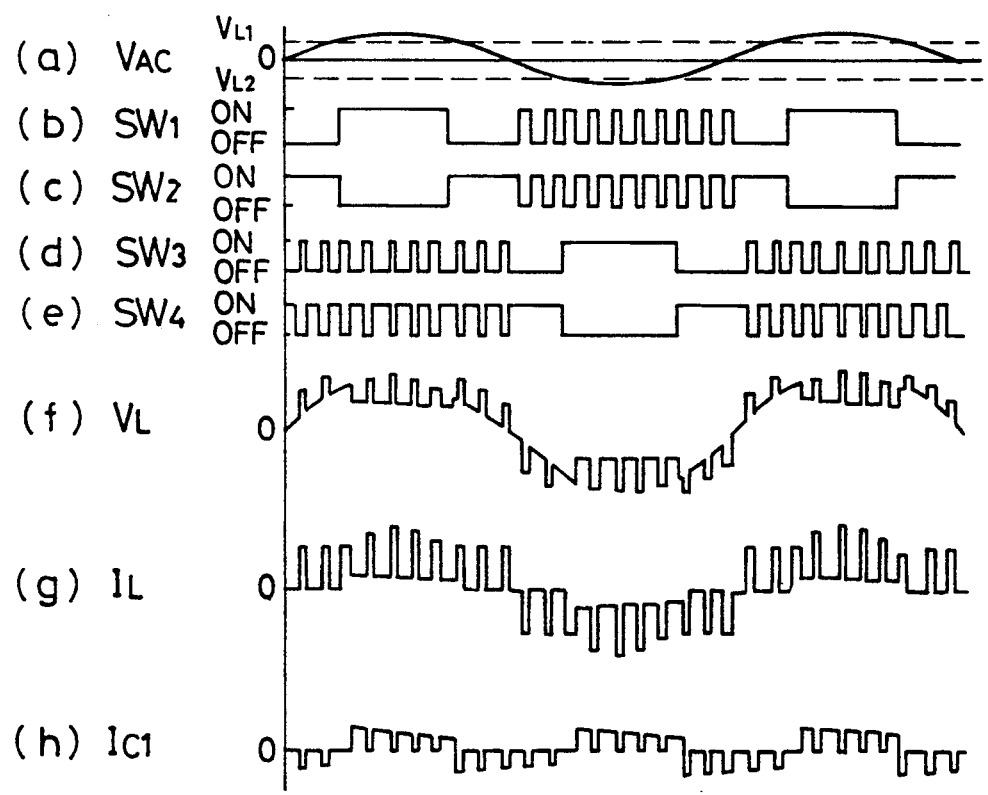
FIG. 22 shows waveforms at various parts in the circuit of FIG. 21.
Figure 25:
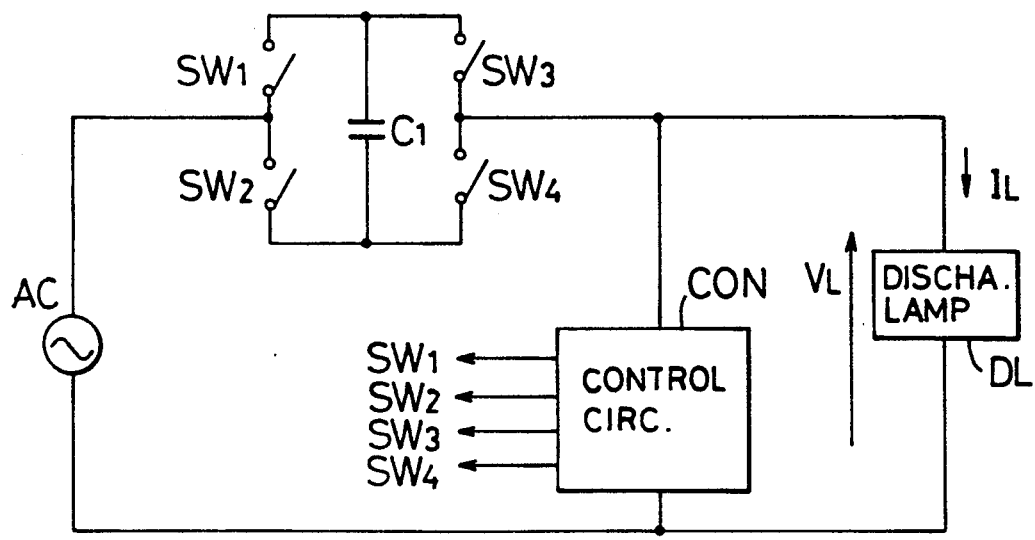
FIG. 25 shows in a circuitry diagram a nineth embodiment of the present invention.
Figure 26:
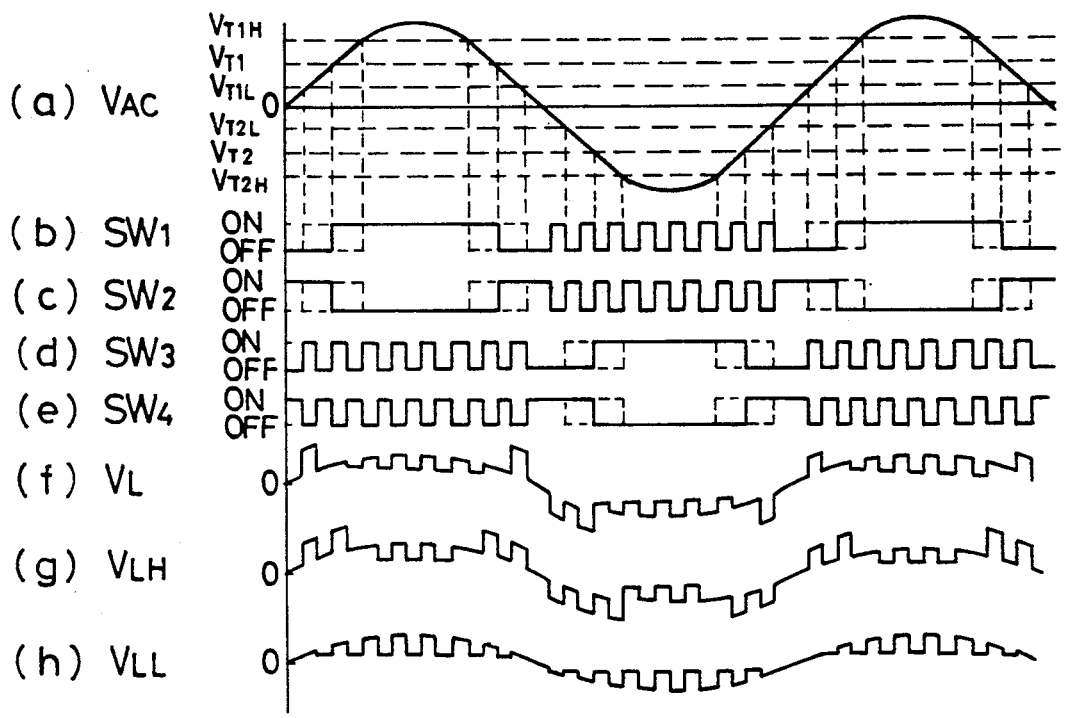
FIG. 26 shows waveforms at various parts in the circuit of FIG. 25.

Referring to FIGS. 25 and 26, there is shown a ninth embodiment of the apparatus for operating discharge lamps according to the present invention, in which the circuit arrangement itself as shown schematically in FIG. 25 may be substantially the same as that of FIG. 21 but, as will be clear when operating waveforms of FIG. 26 for the present embodiment are compared with those in FIG. 22, its operation is so made that the timing of charge and discharge of the capacitor C1 is varied to have the supplied energy from the capacitor to the discharge lamp controlled. Referring more specifically, raising of the threshold voltages VT1 and VT2 to be VT1H and VT2H for varying the timing of charging and discharging of capacitor C1 (as shown in (a) of FIG. 26) will cause the ON period of longer cycle portions of the respective switching means SW1 to SW4 to be shorter (as shown in (b) to (e) of FIG. 26) due to which the voltage VL applied to the discharge lamp DL is made to vary from the one shown in (f) of FIG. 26 to the voltage VLH as in (g) of FIG. 26. Thus, the required time for superposing the capacitor C1 voltage on the source voltage VAC and applying the supercharged voltage to the discharge lamp is prolonged. When on the other hand the threshold voltages VT1 and VT2 are lowered to VT1L and VT2L (as shown in (a) of FIG. 26), the ON period of the longer cycle portions of the respective switching means SW1 to SW4 will then be made longer (as in (b) to (e) of FIG. 26) due to which the discharge lamp voltage VL is made to be the voltage VLL (as in (h) of FIG. 26), and the required time for superposing the capacitor C1 voltage on the source voltage VAC is shortened.

Accordingly, it is made possible to vary the voltage to be applied to the discharge lamp DL by varying the threshold voltages VT1 and VT2. That is, with the threshold voltages VT1 and VT2 made higher to be VT1H and VT2H by sufficiently charging the capacitor C1 within the charging time, the discharge lamp DL can have a higher output and, with the threshold voltages made lower to be VT1L and VT2L, the discharge lamp output can be lowered. In this way, it is made possible to control the output of the discharge lamp DL by controlling the ON period of the switching means SW1 and SW2 in the positive half cycle of the alternating current source voltage VAC, in accordance with which, for example, the output of the discharge lamp DL can be varied without requiring any control for further shortening the ON period of shorter cycle portions of the switching means SW3 and SW4 in the positive half cycles of the source voltage VAC, and an apparatus for operating discharge lamps capable of restraining noise can be thereby provided. Other arrangement, function and effect of the present embodiment are the same as those in the case of FIG. 1 or any of FIGS. 8, 21 and so on.

Figure 27:
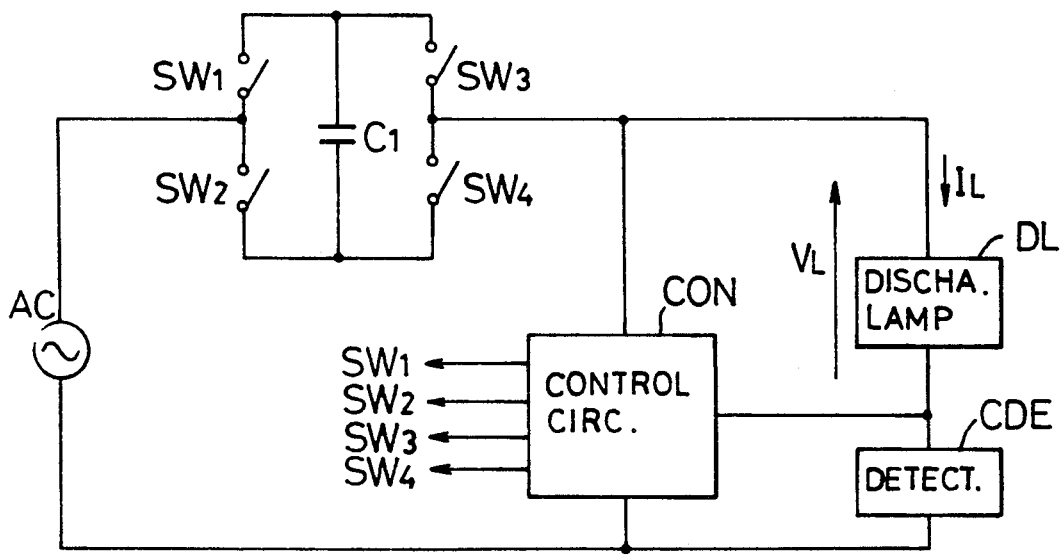
FIG. 27 shows in a circuit diagram another working aspect of the apparatus shown in FIG. 25.

In a working aspect of FIG. 27, the arrangement is so made that, in the embodiment of FIG. 25, a current detecting means CDE for detecting the current to the discharge lamp DL is connected in series with the discharge lamp DL, and a voltage across this current detecting means CDE is subjected to a feedback to the control circuit CON. In this case, the threshold voltages VT1 and VT2 can be shifted to lower levels by increasing output value of the current detecting means CDE and to higher levels by reducing the output value, whereby the output of the discharge lamp DL can be made constant, while rendering the threshold voltages VT1 and VT2 to be at lower levels with respect to the shift to higher side of the source voltage VAC and to be at higher levels with respect to the shift to lower side. Other arrangement, function and effect of the present aspect are the same as those in the embodiment of FIG. 25.

Figure 28:
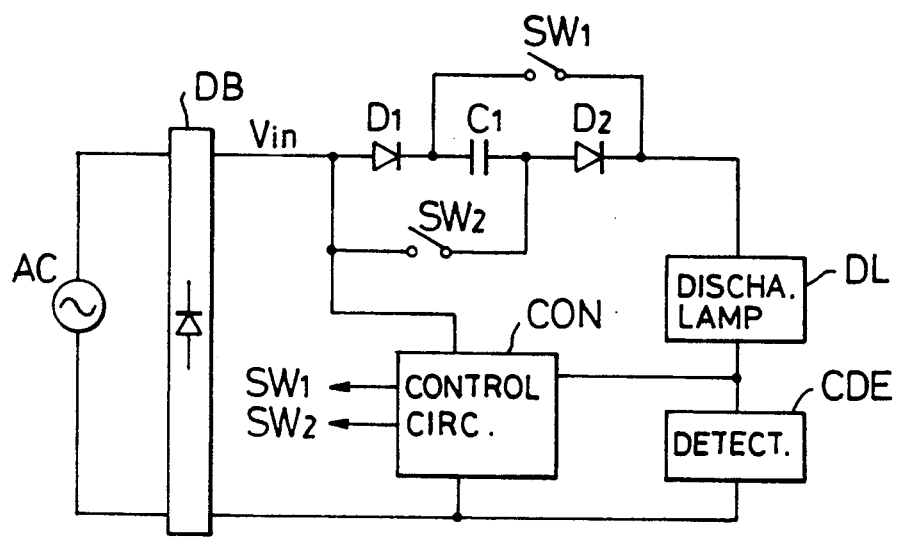
FIG. 28 shows in a circuit diagram still another working aspect of the apparatus of FIG. 25.

In another working aspect of FIG. 28, the arrangement is so made that the current detecting means CDE is connected in series with the discharge lamp DL in the embodiment of FIG. 10. Referring to the operation of this aspect in conjunction with waveforms of FIG. 29, the switching means SW2 is turned ON as in (c) of FIG. 29 when the rectified voltage Vin is lower than the threshold voltage VT1 as in (a) of FIG. 29 to cause the capacitor C1 voltage superposed on the rectified voltage Vin but is turned OFF when the rectified voltage Vin is higher than the threshold voltage VT1 to cause a current to flow through a path DB→D1→SW1→DL when the switching means SW1 is in ON state in which the diode D2 is reverse biased through the capacitor C1. When the switching means SW1 is in OFF state, on the other hand, the current is caused to flow through a path DB D1 C1 D2 DL, upon which an energy is stored in the capacitor C1.

Figure 29:
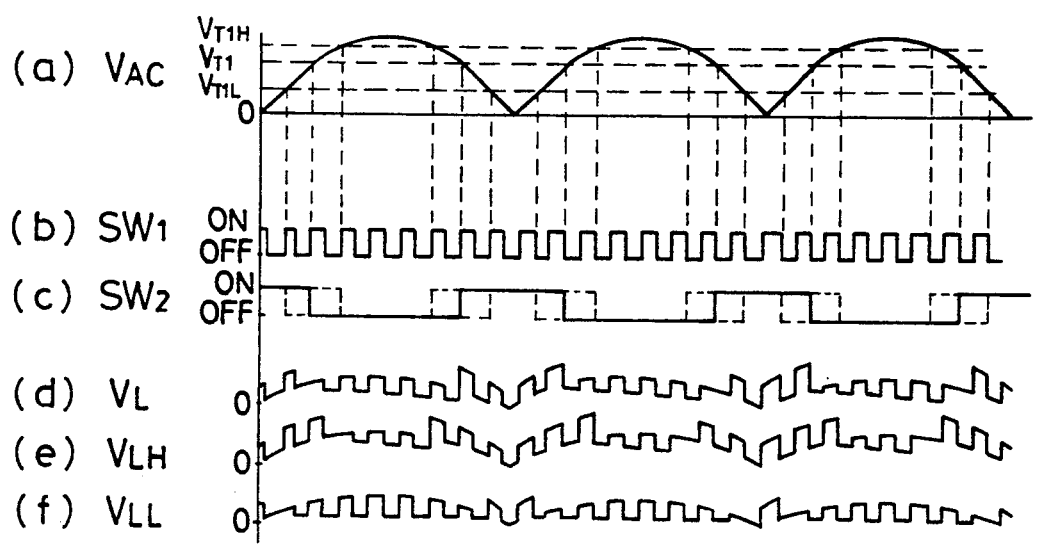
FIG. 29 shows respective waveforms at various parts in the circuit of FIG. 28.

When the switching means SW1 is turned ON as in (b) of FIG. 29 when the switching means SW2 is ON, the current is caused to flow through a path DB→SW2→C1→SW1→DL. At this time, so long as the switching means SW2 is ON, the diode D1 is reverse biased through the capacitor C1. When the threshold voltage is set from VT1 to VT1H as in (a) of FIG. 29, the discharge lamp voltage will shift from VL of (d) to VLH of (e) in FIG. 29, and, when the threshold voltage is set from VT1 to VT1L, the discharge lamp voltage will be VLL as in (f) of FIG. 29 and the voltage value decreases, whereby the discharge lamp current is applied as rectified with respect to the embodiment of FIG. 25, but the same effect as in that embodiment can be attained and the switching means as well as the control circuit CON can be attempted to be simplified. In the working aspect of FIG. 28 as well as in the embodiment of FIG. 10, the discharge lamp current is being rectified so that, so long as the charge in the capacitor C1 is stored with the switching means SW2 is turned ON, the diode D1 is reverse biased and, when the switching means SW1 is turned ON, the diode D2 is reverse biased, so that the switching means can be attempted to be simplified. Other arrangement, function and effect of this aspect are the same as those in the embodiment of FIG. 25.

Figure 30:
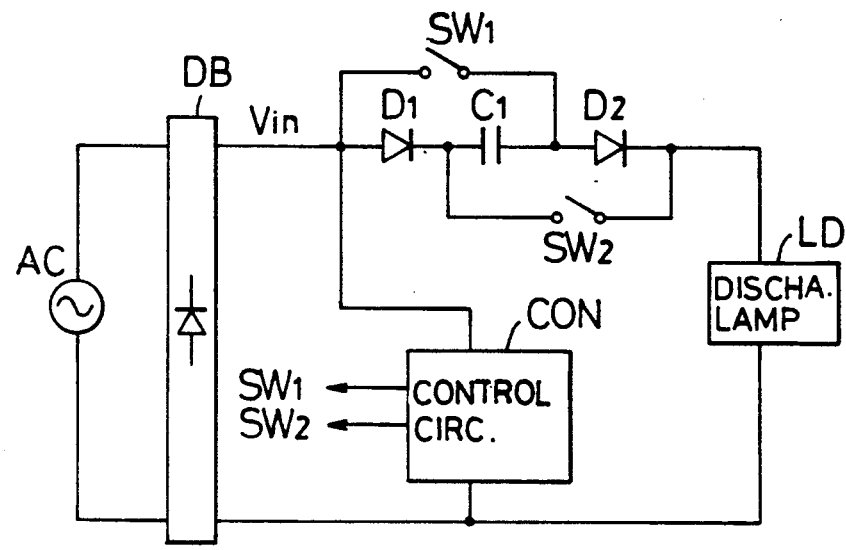
FIGS. 30 and 31 show in circuit diagrams further working aspects of the apparatus shown in FIG. 25.
Figure 31:
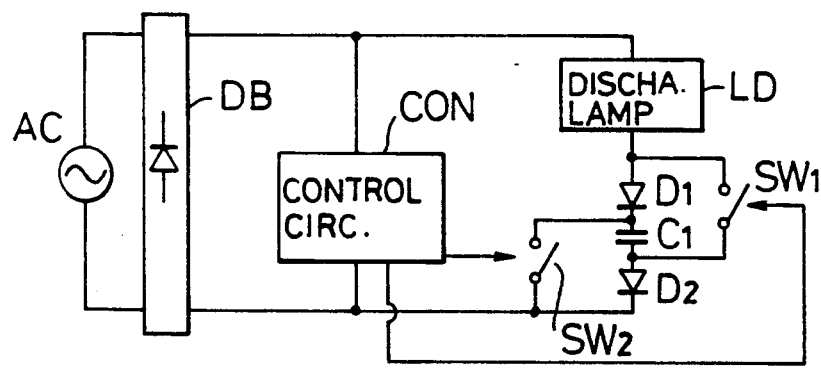

In a working aspect of FIG. 30, the switching means SW1 and SW2 are mutually replaced in contrast to the working aspect of FIG. 28, and the same function and effect as those in the embodiment of FIG. 28 are attained. In a further working aspect of FIG. 31, the switching circuit of the switching means SW1 and SW2, capacitor C1 and diodes D1 and D2 is disposed on the lower potential side, and the same function and effect as those in the foregoing embodiment of FIG. 28 are attained.

Figure 32:
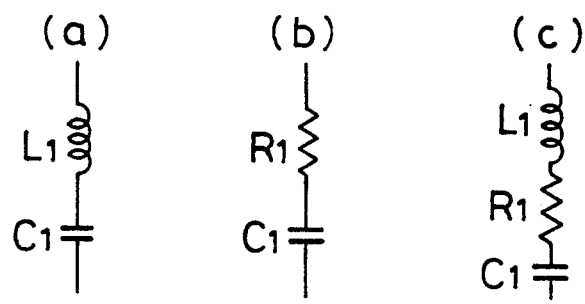
FIG. 32 shows fragmentary circuit diagrams respectively applicable to the embodiment of FIG. 25.

For the switching means employed in the respective embodiments and working aspects as has been described, transistors alone, thyristors, FET's, such reverse parallel connection of the transistors and diode as described with reference to FIG. 23, coupled elements of FET with diode incorporated, or any other equivalents can be properly employed. Further, while in the respective embodiments and working aspects described the capacitor alone has been disclosed to be used as the energy-storing means, it will be possible to employ such series connection of the capacitor C1 and a reactor L1 of a small value as shown in (a) of FIG. 32, such series connection of the capacitor C1 and a resistor R1 as in (b) of FIG. 32, and such series connection of reactor L1 and resistor R1 to the capacitor C1 as in (c) of FIG. 32.

What is claimed is:

1. An apparatus for operating discharge lamps comprising a pulsating power source for producing a pulsating source voltage, a first closed-circuit means including a first switching means connected to said pulsating power source for receiving therefrom the pulsating source voltage, said first switching means having conducting and non-conducting states, said first closed-circuit means connecting a discharge lamp to the pulsating power source through said first switching means, second closed-circuit means including a series circuit comprising energy-storing means and second switching means, said second switching means having conducting and non-conducting states, said second closed-circuit means being coupled to the pulsating power source for receiving therefrom the pulsating source voltage and for connecting said discharge lamp to said pulsating power source through said series circuit of said energy-storing means and said second switching means, said second switching means being made conducting at least in a non-conducting period of said first switching means for providing energy to said energy-storing means, third closed-circuit means including third switching means for common polarity superposition of the pulsating source voltage and a voltage of said energy-storing means and for applying the resulting superposed voltage to the discharge lamp when a discharge lamp current falls below a predetermined value due to a drop of the pulsating source voltage while said first and second switching means are conducting, and control means connected to at least one of said first, second, and third switching means for controlling their operation.

2. The apparatus according to claim 1 wherein said control means is connected to said first switching means for switching said first switching means to its non-conducting state when the discharge lamp current has reached a predetermined value.

3. The apparatus according to claim 1 wherein said control means is connected to said first switching means for switching said first switching means to its conducting state to prevent interruption of the discharge lamp current.

4. The apparatus according to claim 1 wherein said control means is connected to said second switching means for charging said energy-storing means.

5. The apparatus according to claim 1 wherein said control means is connected to said first and second switching means for maintaining said first and second switching means in mutually opposite conducting and non-conducting states.

6. The apparatus according to claim 1 wherein said control means controls more than one of said first, second, and third switching means for maintaining a continuous flow of the discharge lamp current in response to the pulsating power source voltage.

7. The apparatus according to claim 1 wherein said discharge lamp is connected to said first closed-circuit of said first switching means to form therewith a series circuit connected in parallel with said pulsating power source, and said energy-storing means in said second closed-circuit is connected to produce a continuous flow of the discharge lamp current when said first switching means is in its non-conducting state.

8. The apparatus according to claim 7 wherein said control means is connected to said pulsating power source and said first switching means for providing to said first switching means an output control signal of varying pulse width controlled in response to variations in the pulsating source voltage when said first switching means is in its conducting state for reducing variations in the discharge lamp current.

9. The apparatus according to claim wherein each of said second and third switching means includes diodes, and said control means is connected to said first switching means.

10. The apparatus according to claim 1 wherein said first switching means comprises four switching devices connected in a bridge circuit, said bridge circuit being connected in parallel with said pulsating power source, the discharge lamp being connected across said bridge circuit, said energy-storing means comprising a capacitor, and said third switching means comprises a diode, said capacitor and diode being connected in series at a junction point and connected in parallel with said bridge circuit, and said second switching means comprises a pair of switching devices connected from respective ends of the discharge lamp and to the junction point of said series-connected capacitor and diode.

11. The apparatus according to claim 10 wherein control means is connected to said pulsating power source and said first switching means for providing to the first switching means an output control signal of varying pulse width controlled in response to variations in the pulsating source voltage upon predetermined actuation of said switching devices in said bridge circuit to reduce fluctuations in the discharge lamp current.

12. The apparatus according to claim 1 wherein said first switching means comprises first and second switching elements, said second switching means comprises a third switching element, and said third switching means comprises a fourth switching element, said first, second, third, and fourth switching elements being connected in a bridge circuit, said bridge circuit being connected in series with the discharge lamp, said series connected discharge lamp and bridge circuit being connected to said pulsating power source and wherein said energy-storing means comprises a capacitor connected to said bridge circuit, said first switching means operating mutually complimentarily in a pulsating cycle of the pulsating power source with said second and third switching means.

13. The apparatus according to claim 12 wherein said control means controls said first, second, and third switching means so that said discharge lamp and pulsating power source are alternatingly directly connected together and through said capacitor.

14. The apparatus according to claim 13 wherein said control means is connected to said pulsating power source and said first switching means for providing to said first switching means an output control signal of varying pulse width upon predetermined actuation of said first switching means, the pulse width being controlled in response to variations in the pulsating source voltage for reducing fluctuations in the discharge lamp current.

15. The apparatus according to claim 13 wherein said control means is connected to said pulsating power source and said first, second, and third switching means for varying superposition of stored energy in said capacitor on the pulsating source voltage for varying light output of the discharge lamp.

16. The apparatus according to claim 1 wherein said second switching means includes a first diode, said third switching means includes a second diode, and said energy-storing means includes a capacitor and a series circuit including said second switching means, said energy-storing means, said third switching means and said discharge lamp is connected to said pulsating power source, and including first and second switching devices, said first switching device being connected in parallel with said first diode and capacitor connected in series, said second switching device being connected in parallel with said capacitor and said second diode connected in series.

17. The apparatus according to claim 16 wherein said control means connects said pulsating power source in series with said capacitor through one of said first and second devices by controlling said first and second switching devices.

18. The apparatus according to claim 17 wherein said control means is connected to said pulsating power source and said first switching means for providing to said first switching means an output control signal of varying pulse width upon predetermined actuation of said first switching means, the pulse width being controlled in response to variations in the pulsating source voltage for reducing fluctuations in the discharge lamp current.

19. The apparatus according to claim 17 wherein said control means is connected to said pulsating power source and said first, second, and third switching means for varying superposition of stored energy in said capacitor on the pulsating source voltage for varying light output of the discharge lamp.

20. An apparatus for controlling discharge lamps comprising:
a pulsating voltage source for producing a pulsating voltage;
first closed-circuit means, including first switching means, for alternatively connecting a discharge lamp to and disconnecting the discharge lamp from the pulsating voltage source;

second closed-circuit means having a conducting state and non-conducting state, including energy-storing means and second switching means connected in a series circuit, the second closed-circuit means being coupled to the pulsating voltage source, for selectively connecting said discharge lamp to the pulsating voltage source through the series circuit, the second closed-circuit means being in its conducting state at least when said first switching means disconnects the discharge lamp from the pulsating voltage source for providing energy to the energy-storing means; and means, coupled to the second closed-circuit means and to the pulsating voltage source, for superposing, with the same polarity, the pulsating voltage of the pulsating voltage source and a voltage of the energy-storing means and for applying the resulting superposed voltage to the discharge lamp when a discharge lamp current falls below a predetermined value due to a drop of the pulsating voltage.

* * * * *

UNITED STATES PATENT AND TRADEMARK OFFICE
CERTIFICATE OF CORRECTION

PATENT NO. : 5,229,690

DATED : July 20, 1993

INVENTOR(S) : Ohnishi et al.

It is certified that error appears in the above-indentified patent and that said Letters Patent is hereby corrected as shown below:

Claim 9, col. 17, line 37, after "claim" insert --7--.

Claim 11, col. 17, line 55, before "control" insert --said--.

Signed and Sealed this

Fifteenth Day of March, 1994

*Attest:*

BRUCE LEHMAN

*Attesting Officer*     *Commissioner of Patents and Trademarks*